(12) United States Patent
Huang et al.

(10) Patent No.: US 11,368,674 B1
(45) Date of Patent: Jun. 21, 2022

(54) IMAGE CALIBRATION METHOD OF IMAGING SYSTEM PROVIDING COLOR APPEARANCE CONSISTENCY

(71) Applicants: BenQ Intelligent Technology (Shanghai) Co., Ltd, Shanghai (CN); BENQ CORPORATION, Taipei (TW)

(72) Inventors: Guo-Rong Huang, Taipei (TW); Yi-Ho Bai, Taoyuan (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/375,005

(22) Filed: Jul. 14, 2021

(30) Foreign Application Priority Data

Mar. 19, 2021 (CN) .......................... 202110294239.4

(51) Int. Cl.
*H04N 17/00* (2006.01)
*H04N 17/02* (2006.01)

(52) U.S. Cl.
CPC ........... *H04N 17/002* (2013.01); *H04N 17/02* (2013.01)

(58) Field of Classification Search
CPC ................ H04N 17/02; H04N 17/002; G09G 2320/0693; G09G 2320/0242; G09G 2320/06; G09G 5/04
See application file for complete search history.

(56) References Cited

U.S. PATENT DOCUMENTS

| | | | | |
|---|---|---|---|---|
| 5,956,015 A | * | 9/1999 | Hino | ........................ G09G 5/02 345/600 |
| 6,453,066 B1 | * | 9/2002 | Shiraiwa | .................... G01J 3/46 382/162 |
| 7,102,648 B1 | * | 9/2006 | Holub | ........................ G06F 3/14 345/589 |
| 8,860,751 B2 | * | 10/2014 | Sullivan | ................ G06T 11/001 345/601 |
| 9,183,812 B2 | * | 11/2015 | Myers | ....................... G09G 5/06 |
| 9,799,306 B2 | * | 10/2017 | Dunn | ........................ G09G 5/02 |
| 10,593,555 B2 | * | 3/2020 | Gao | ..................... H01L 21/0332 |

(Continued)

FOREIGN PATENT DOCUMENTS

| | | |
|---|---|---|
| CN | 101217674 B | 11/2011 |
| TW | 202046713 A | 12/2020 |

*Primary Examiner* — Brian P Yenke
(74) *Attorney, Agent, or Firm* — Winston Hsu (57) ABSTRACT

An image calibration method for use in an imaging system. The imaging system includes a projection device, a color detector and a processor. The image calibration method includes in an ambient light environment, the color detector taking a background luminance and an ambient measurement of a test image on a projection surface, and the processor generating a color appearance representation using the background luminance and the ambient measurement, in a darkroom environment, the color detector taking a darkroom measurement of a test image, and if a surround ratio is less than a predetermined threshold, the processor generating a target using the darkroom measurement and the color appearance representation, and the processor configuring a gamut of the projection device according to the target, and adjusting an image according to the gamut and the darkroom measurement, and the projection device projecting the adjusted image.

25 Claims, 6 Drawing Sheets

(56) References Cited

U.S. PATENT DOCUMENTS

| | | | |
|---|---|---|---|
| 10,607,520 B2* | 3/2020 | Schuch | G09G 3/20 |
| 10,672,363 B2* | 6/2020 | Marcu | G06T 5/009 |
| 11,024,260 B2* | 6/2021 | Greenebaum | G09G 5/10 |
| 2003/0179211 A1* | 9/2003 | Wada | H04N 9/73 345/589 |
| 2006/0039017 A1* | 2/2006 | Park | G09G 3/3607 358/1.9 |
| 2008/0012875 A1* | 1/2008 | Newman | G09G 5/02 345/589 |
| 2008/0165292 A1* | 7/2008 | Bing | H04N 9/3194 348/744 |
| 2011/0148903 A1* | 6/2011 | Poree | G06T 7/12 345/589 |
| 2011/0149152 A1* | 6/2011 | Yamamura | H04N 21/4318 348/453 |
| 2011/0175925 A1* | 7/2011 | Kane | H04N 21/42202 345/589 |
| 2012/0081279 A1* | 4/2012 | Greenebaum | G09G 5/02 345/156 |
| 2012/0182278 A1* | 7/2012 | Ballestad | G01J 1/4204 345/207 |
| 2014/0028697 A1* | 1/2014 | Kurtz | G01J 3/465 345/589 |
| 2014/0028699 A1* | 1/2014 | Kurtz | G01J 3/465 345/590 |
| 2014/0333649 A1* | 11/2014 | Tatsumi | G09G 5/003 345/589 |
| 2020/0380938 A1* | 12/2020 | Greenebaum | G09G 5/10 |

* cited by examiner

30 Stimulus point
32 Proximal field
34 Background area
36 Surround field

FIG. 3

| Color management | | | |
|---|---|---|---|
| Color | ◁ | Red | ▷ |
| Hue | 189 | | |
| Saturation | 197 | | |
| Color gain | 187 | | |
| | | | Return |

IMAGE CALIBRATION METHOD OF IMAGING SYSTEM PROVIDING COLOR APPEARANCE CONSISTENCY

CROSS REFERENCE TO RELATED APPLICATION

This non-provisional application claims priority of China patent application No. 202110294239.4, filed on 19 Mar. 2021, included herein by reference in its entirety.

BACKGROUND OF THE INVENTION

1. Field of the Invention

The present invention relates to image processing, and in particular, to an image calibration method of an imaging system providing a color appearance consistency.

2. Description of the Prior Art

A projector is an optical device for use to project images to a screen. In the related art, images projected by the projector are affected by the ambient light, leading to inconsistency between the color appearance in the ambient light and the color appearance in the darkroom.

At present, calibrations are addressed to the hardware of a projector but not to the user's visual experience in the environment. Therefore, a projector of maintaining the color appearance consistency in different ambient light environments is in need to keep the user's visual perception unaffected by the ambient light.

SUMMARY OF THE INVENTION

According to an embodiment of the invention, an imaging system includes a projection device, a color sensor and a processor. An image calibration method of the imaging system includes in ambient light, configuring the projection device to utilize a first gamut to project a test image onto a projection surface. The test image includes a color black, a color white and at least one predetermined color, in the ambient light. The method further includes the color sensor taking at least one of a set of ambient light measurements of the color black, a set of ambient light measurements of the color white, and a set of ambient light measurements of the at least one predetermined color, the processor generating a set of color appearance representatives of the color black, a set of color appearance representatives of the color white, and a set of color appearance representatives of the at least one predetermined color according to the set of ambient light measurements of the color black, the set of ambient light measurements of the color white, the set of ambient light measurements of the at least one predetermined color, a luminance of an adapting field in the ambient light, and a background luminance in the ambient light and a set of surround parameters in the ambient light. In addition, the method further includes in a darkroom, the projection device projecting the test image onto the projection surface, in the darkroom, the color sensor taking at least one of a set of darkroom measurements of the color black, a set of darkroom measurements of the color white, and a set of darkroom measurements of the at least one predetermined color, if a surround ratio is less than a predetermined threshold, the processor generating at least one set of target values of the at least one predetermined color according to the set of color appearance representatives of the at least one predetermined color, the set of darkroom measurements of the color white, a luminance of the adapting field in the darkroom, and a background luminance in the darkroom and a set of surround parameters in the darkroom, the processor configuring the projection device to a second gamut according to the at least one set of target values of the at least one predetermined color, the second gamut being different from and the first gamut, the processor transforming a set of color values of a pixel in an original image according to the second gamut to generate a set of transformed color values, the set of transformed color values including a first color component, a second color component and a third color component. Furthermore, the method includes the processor adding a lightness in the set of color appearance representatives of the color black to the first color component, the second color component, and the third color component to generate a first adjusted color component, a second adjusted color component and a third adjusted color component, and in the darkroom, the projection device projecting the first adjusted color component, the second adjusted color component, and the third adjusted color component.

According to another embodiment of the invention, an imaging system includes a projection device, a color sensor and a processor. An image calibration method of the imaging system includes in ambient light, configuring the projection device to utilize a first gamut to project a test image onto a projection surface, the test image including black and white; and in the ambient light, the color sensor taking at least one of a set of ambient light measurements of the color black and a set of ambient light measurements of the color white. The method further includes the processor generating a set of color appearance representatives of the color black according to the set of ambient light measurements of the color black, the set of ambient light measurements of the color white, a luminance of an adapting field in the ambient light, and a background luminance in the ambient light and a set of surround parameters in the ambient light; the processor transforming a set of color values of a pixel in an original image according to a second gamut to generate a set of transformed color values, the set of transformed color values including a first color component, a second color component and a third color component. Furthermore, the method includes the processor adding a lightness in the set of color appearance representatives of the color black to the first color component, the second color component, and the third color component to generate a first adjusted color component, a second adjusted color component and a third adjusted color component, and in a darkroom, the projection device projecting the first adjusted color component, the second adjusted color component, and the third adjusted color component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
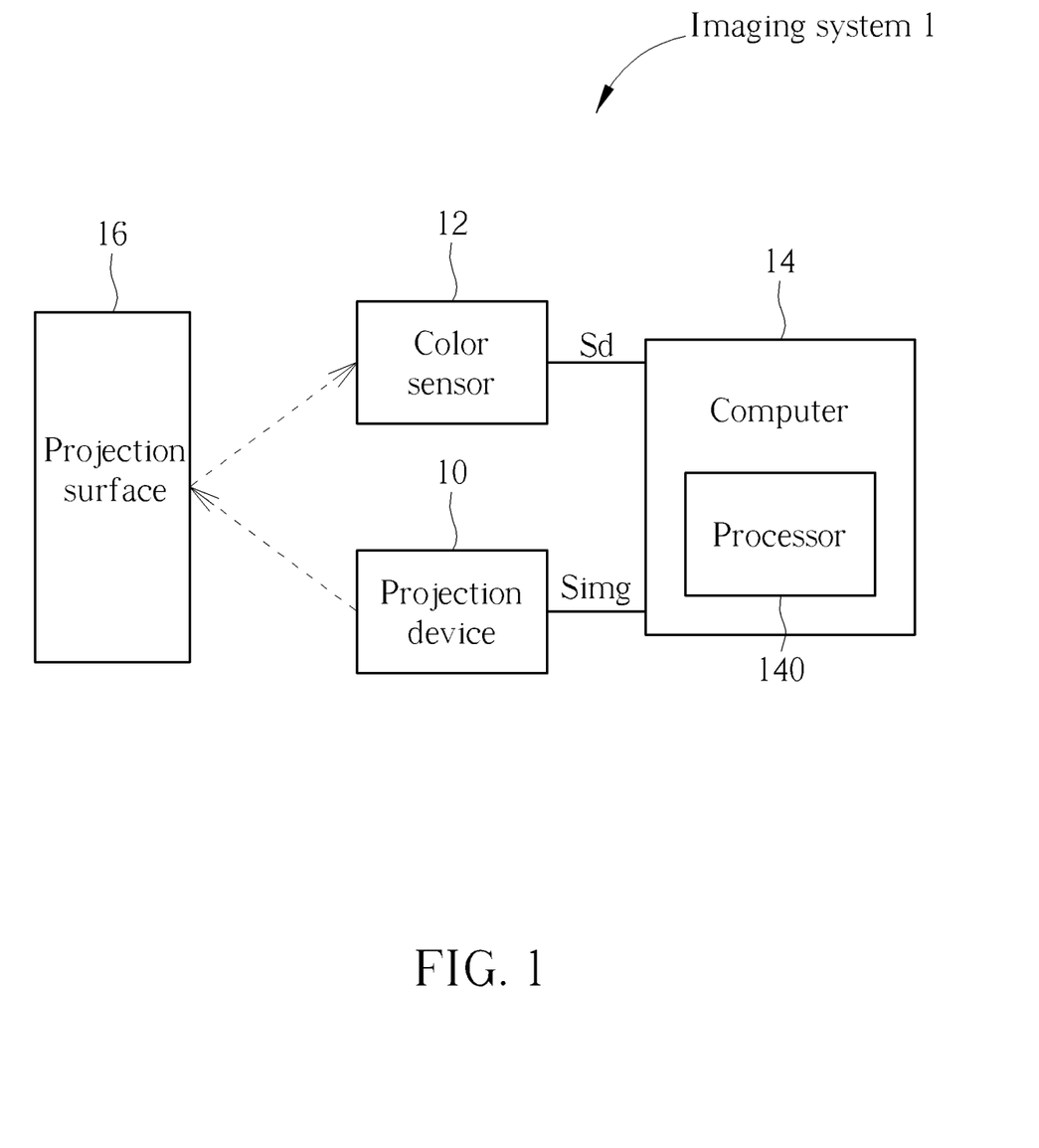
FIG. 1 is a block diagram of an imaging system according to an embodiment of the invention.

FIG. 1 is a block diagram of an imaging system 1 according to an embodiment of the invention. The imaging system 1 may maintain color appearance consistency of an image without being affected by the ambient light, leading to a consistent color appearance in the ambient light and in the darkroom.

The imaging system 1 includes a projection device 10, a color sensor 12, a computer 14 and a projection surface 16. The computer 14 may include a processor 140. The projection device 10 and the color sensor 12 may be coupled to the processor 140 via a universal serial bus (USB) interface, an RS-232 communication port interface, or other communication interfaces. In some embodiments, the processor 140 may be located in the projection device 10, and the computer 14 may be omitted from the imaging system 1. The color sensor 12 may be a spectrophotometer such as X-rite i1Pro2, i1 Studio, i1 Display Pro or other monitor color calibrators. The projection surface 16 may be a projection screen or a wall surface. The color sensor 12 and the projection surface 16 are separated by a predetermined distance, e.g., 40 cm.

The test environment of the imaging system 1 may be set in an ambient light environment or in a darkroom. In the ambient light environment, the light source may be a natural light and/or an artificial light. In the darkroom, the light source may be blocked or turned off. The processor 140 may transmit an image signal Simg to the projection device 10. The projection device 10 may project an image onto the projection surface 16 according to the image signal Simg. The color sensor 12 may measure a luminance on the projection surface 16 and the color components at different wavelengths in the test environment to generate the measurement signal Sd, and send the measurement signal Sd to the processor 140. The processor 140 may calibrate the gamut of the projection device 10 and/or perform a contrast and saturation calibrations according to the measurement signal Sd, so as to maintain of a color appearance consistency of the image.

Figure 2A:
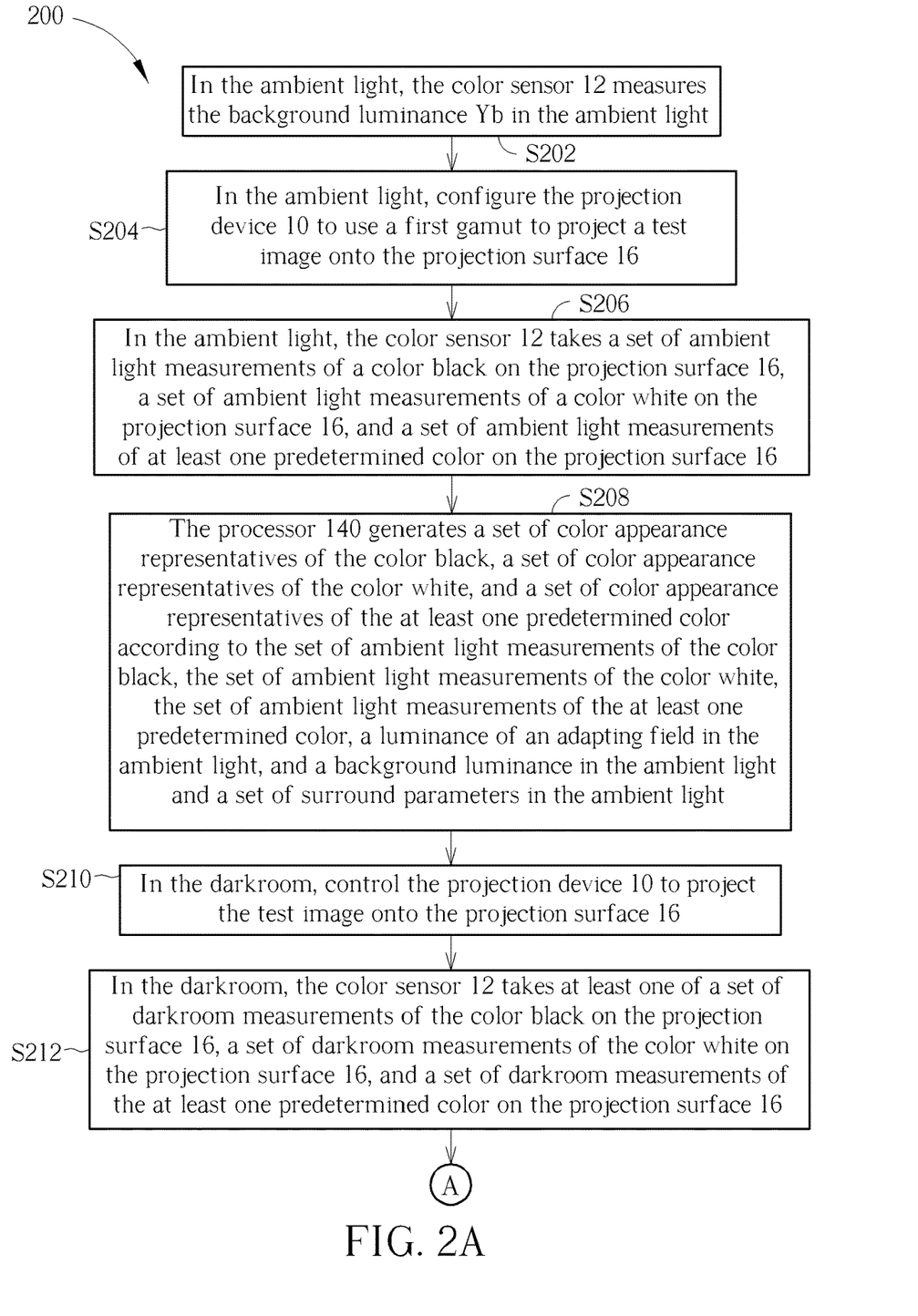
FIG. 2A, 2B are a flowchart of an image calibration method of the imaging system in FIG. 1.
Figure 2B:
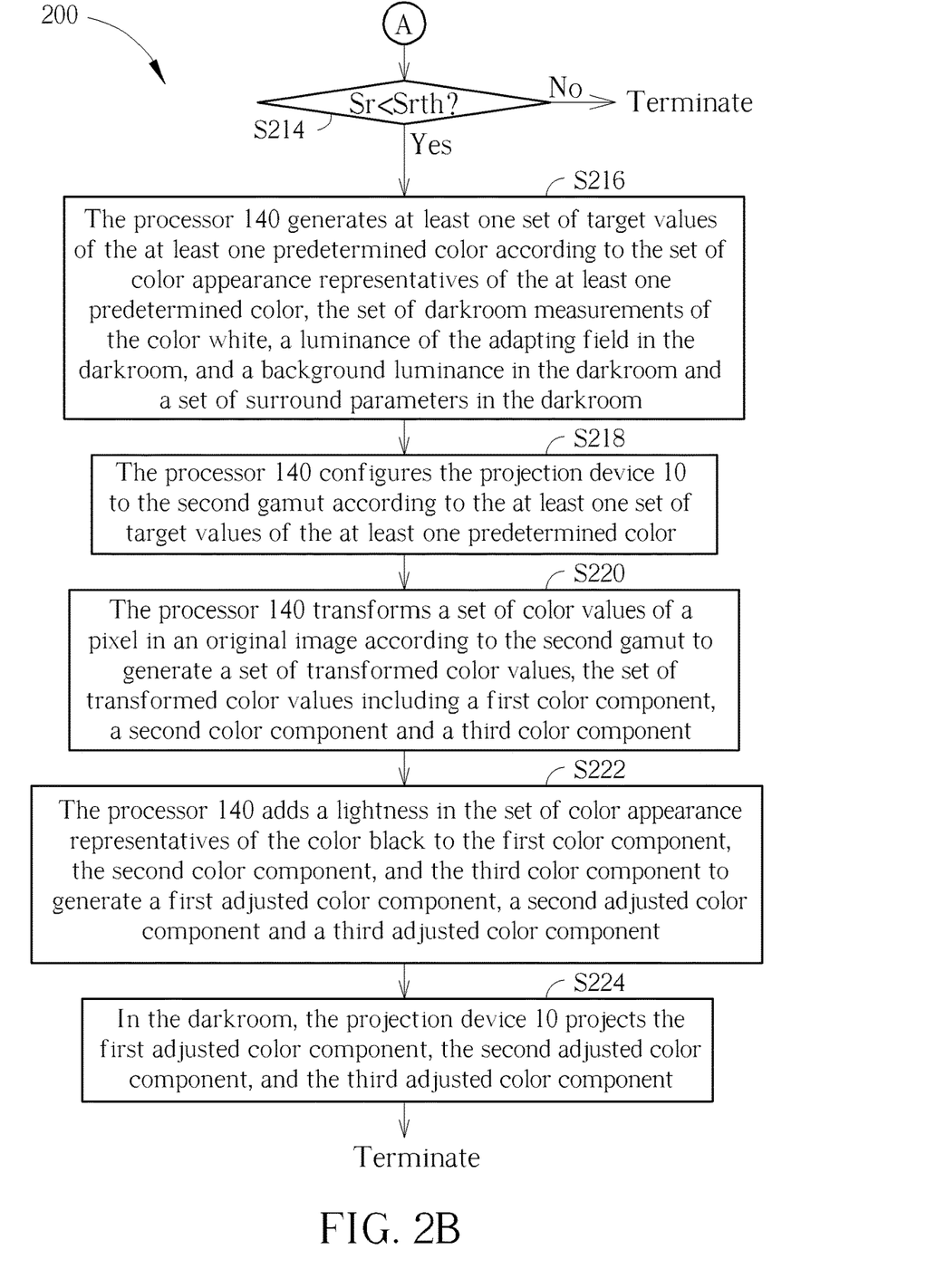

FIG. 2A, 2B are a flowchart of an image correction method 200 of the imaging system 1, including Steps S202 to S224 for maintaining the color appearance consistency of the image. Steps S202 to S208 are used to generate color appearance representatives in the ambient light. Steps S210 to S218 are used to calibrate a gamut of the projection device 10. Steps S220 to S224 are used to perform the contrast and saturation calibration for the image. Any reasonable step change or adjustment is within the scope of the disclosure. Steps S202 to S224 are detailed as follows:

Step S202: In the ambient light, the color sensor 12 measures the background luminance Yb in the ambient light;

Step S204: In the ambient light, configure the projection device 10 to use a first gamut to project a test image onto the projection surface 16;

Step S206: In the ambient light, the color sensor 12 takes a set of ambient light measurements of a color black on the projection surface 16, a set of ambient light measurements of a color white on the projection surface 16, and a set of ambient light measurements of at least one predetermined color on the projection surface 16;

Step S208: The processor 140 generates a set of color appearance representatives of the color black, a set of color appearance representatives of the color white, and a set of color appearance representatives of the at least one predetermined color according to the set of ambient light measurements of the color black, the set of ambient light measurements of the color white, the set of ambient light measurements of the at least one predetermined color, a luminance of an adapting field in the ambient light, and a background luminance in the ambient light and a set of surround parameters in the ambient light;

Step S210: In the darkroom, control the projection device 10 to project the test image onto the projection surface 16;

Step S212: In the darkroom, the color sensor 12 takes at least one of a set of darkroom measurements of the color black on the projection surface 16, a set of darkroom measurements of the color white on the projection surface 16, and a set of darkroom measurements of the at least one predetermined color on the projection surface 16;

Step S214: The processor 140 determines whether the surround ratio Sr is less than a predetermined threshold Srth? If so, proceed to Step S216, if not, terminate the image calibration method 200.

Step S216: The processor 140 generates at least one set of target values of the at least one predetermined color according to the set of color appearance representatives of the at least one predetermined color, the set of darkroom measurements of the color white, a luminance of the adapting field in the darkroom, and a background luminance in the darkroom and a set of surround parameters in the darkroom;

Step S218: The processor 140 configures the projection device 10 to the second gamut according to the at least one set of target values of the at least one predetermined color;

Step S220: The processor 140 transforms a set of color values of a pixel in an original image according to the second gamut to generate a set of transformed color values, the set of transformed color values including a first color component, a second color component and a third color component;

Step S222: The processor 140 adds a lightness in the set of color appearance representatives of the color black to the first color component, the second color component, and the third color component to generate a first adjusted color component, a second adjusted color component and a third adjusted color component;

Step S224: In the darkroom, the projection device 10 projects the first adjusted color component, the second adjusted color component, and the third adjusted color component, terminate the image calibration method 200.

Figure 3:
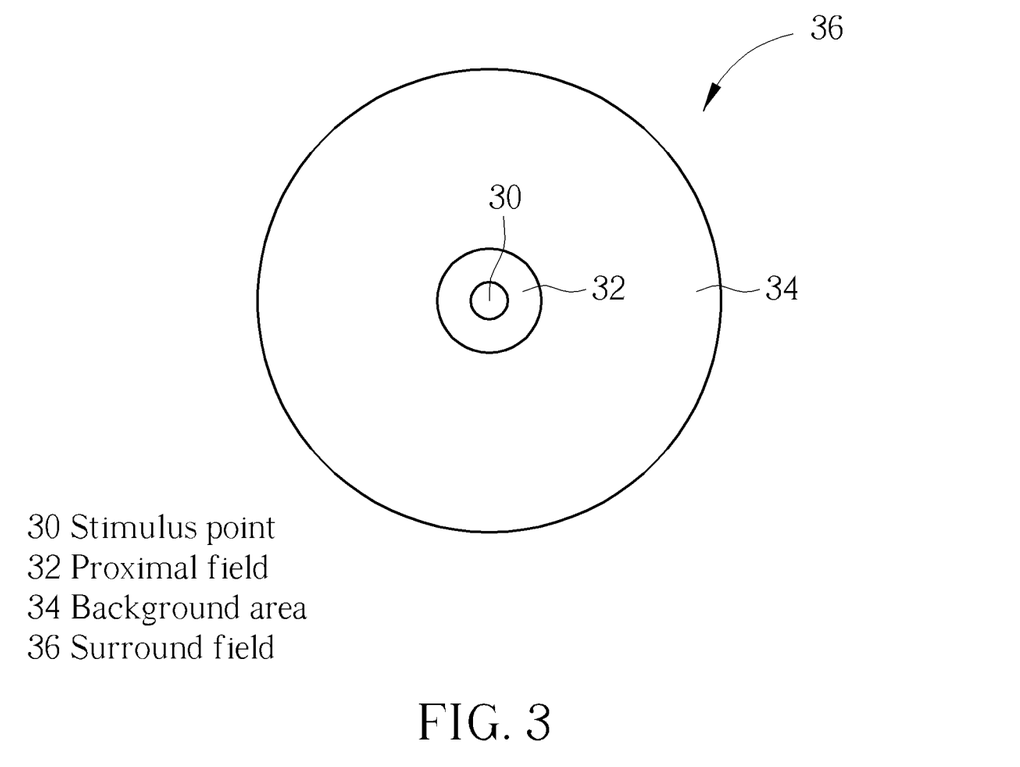
FIG. 3 is a schematic diagram of a measurement area of the imaging system in FIG. 1.

In Step S202, the projection device 10 is turned off in the ambient light, and the color sensor 12 measures a relative luminance on the projection surface 16 to serve as the background luminance Yb in the ambient light. In some embodiments, the projection device 10 may project a color black on the projection surface 16 in the ambient light, and the color sensor 12 measures the luminance of the color black on the projection surface 16 to serve as the background luminance Yb in the ambient light. In other embodiments, the color sensor 12 may measure the luminance of a background area to generate the background luminance Yb in the ambient light. FIG. 3 is a schematic diagram of a measurement area of the imaging system 1, including a stimulus point 30, a proximal field 32, a background area 34 and a surround field 36. The stimulus point 30 is the center of a projection of the projection device 10, the proximal field 32 includes a range observed by the color sensor 12 extending out 2° of the viewing angle from the stimulus point 30, and the background area 34 includes a range observed by the color sensor 12 further extending out 10° of the viewing angle from the proximal field 32, and the surround field 36 includes a range observed by the color sensor 12 further extending out from the background area 34. Since the ambient light will dominate the luminance of the color black and the background area 34 on the project surface 16, the background luminance Yb in the ambient light acquired by the three methods are substantially identical.

In Step S204, the first gamut may be the largest gamut supported by the projection device 10 and larger than or equal to the Digital Cinema Initiatives (DCI)-P3 gamut. The test image may include a black color, a white color, and/or at least one predetermined color. The at least one predetermined color includes all or a combination of the six-axis colors. The six-axis colors include red, green, blue, cyan, magenta and yellow. Each color may be represented by red, green, blue (RGB) components. For example, black (R,G,B) is (0,0,0), white (R,G,B) is (255,255,255), red (R,G,B) is (255,0,0), green (R,G,B) is (0,255,0), blue (R,G,B) is (0,0,255), cyan (R,G,B) is (0,255,255), magenta (R,G,B) is (255,0,255), and yellow (R,G,B) is (255,255,0). Since the ambient light will shrink the gamut of the projection device 10, the gamut of the projection device 10 is set to be larger than or equal to the DCI-P3 gamut to maintain a maximal standard red green blue (sRGB) gamut for the projection device 10 in the ambient light without being shrunk too much to result in an unacceptable visual effect.

In Step S206, each one of the set of ambient light measurements of the color black, the set of ambient light measurements of the color white, and the at least one set of ambient light measurements of the at least one predetermined color may include a tri-stimulus value, represented by the International Commission on Illumination (CIE) XYZ. The set of ambient light measurements of the color white may be regarded as the XYZ value of a reference white, and the Y value of the color white may be regarded as the absolute luminance Lw of the reference white. For example, Table 1 shows measured values XYZ of colors black, white, red, green, blue, cyan, magenta, and yellow measured by the color sensor 12 in the ambient light:

TABLE 1

| In the ambient light | X | Y | Z |
|---|---|---|---|
| black | 13.364 | 13.410 | 8.929 |
| white | 226.315 | 238.090 | 253.599 |
| red | 118.796 | 62.490 | 9.001 |
| green | 96.284 | 230.280 | 21.659 |
| blue | 62.105 | 22.160 | 274.311 |
| green | 134.518 | 210.970 | 286.348 |
| Magenta | 165.831 | 81.570 | 241.921 |
| yellow | 176.493 | 213.710 | 17.874 |

In Step S208, the processor 140 transforms each set of ambient light measurements into a set of color appearance representatives according to the color appearance model (CAM). The set of color appearance representatives may include a lightness (J), a red and green correlate (a) and a yellow and blue correlate (b) defined by the CIE color appearance model. The color appearance model may be the CIECAM02 model, the CIECAM16 model or other CIECAM models, and the transform model of CIECAM16 may be expressed by Equation (1):

$$Jab = XYZCAM16UCS(XYZ, XYZw, La, Yb, \text{surround}) \quad \text{Equation (1)}$$

where Jab is a set of color appearance representatives;
XYZ is an ambient light measurement of a given color;
XYZw is an ambient light measurement of the color white;
La is a luminance of the adapting field;
Yb is the background luminance, and
Surround denotes surround parameters including a factor determining an adaptation degree F., an impact of surrounding c, and a chromatic induction factor Nc.

The luminance La of the adapting field may be obtained by the projection device 10 projecting the color white to the projection surface 16 and the color sensor 12 directly measuring an absolute luminance of the color white at the stimulus point 30 on the projection surface 16. In some embodiments, the luminance La of the adapting field may also be computed using the measured values of the color white according to Equation (2). The Equation (2) is expressed by:

$$La = \frac{Ew}{\pi} \frac{Yb}{Yw} = \frac{LwYb}{Yw} \quad \text{Equation (2)}$$

Where La is the luminance of the adapting field;
Lw is the absolute luminance of the color white, measured in cd/m²;
Ew is a luminance of the color white, measured in Lux, Ew=πLw;
Yb is the background luminance, and
Yw is a relative luminance of the color white in the adapting field.

In the ambient light, the color sensor 12 measures the luminance on the projection surface 16 to obtain the relative luminance Yw of the color white in the adapting field. The processor 140 substitutes the absolute luminance Lw of the color white, the background luminance Yb in the ambient light, and the relative luminance Yw of the color white in the adapting field into Equation (2) to compute the luminance La of the adapting field in the ambient light.

The processor 140 computes the surround ratio Sr. The surround ratio Sr may be expressed by Equation (3):

$$Sr = Lsw/Ldw \quad \text{Equation (3)}$$

Where Sr is the surround ratio;
Lsw is an absolute luminance on the projection surface in the surround field, and
Ldw is an absolute luminance of the color white in the display area.

The Equation (3) shows that the surround ratio Sr is a ratio of the absolute luminance Lsw on the projection surface in the surround field to the absolute luminance Ldw of the color white in the display area. In some embodiments, the background luminance Yb in the ambient light may be regarded as the absolute white luminance Lsw in the surround field, and the absolute luminance Lw of the color white may be regarded as the absolute white luminance Ldw in the display area, and then the processor 140 may compute according to Equation (3) the surround ratio Sr of the background luminance Yb in the ambient light to the relative luminance Lw of the color white. In some embodiments, the color sensor 12 may measure the luminance of the color white on the projection surface 16 and the luminance of the surround field 36, and the processor 140 may compute the surround ratio Sr of the luminance of the color white on the projection surface 16 to the luminance in the surround field 36 according to Equation (3).

The processor 140 acquires, from Table 2 and according to the surround ratio Sr, the surround parameters including the degree of adaptation factor F, the impact of surrounding c and the chromatic induction factor Nc.

TABLE 2

| Surround condition | Sr | F | c | Nc |
| --- | --- | --- | --- | --- |
| average | Sr > 0.2 | 1.0 | 0.69 | 1.0 |
| dim room | 0 < Sr < 0.2 | 0.9 | 0.59 | 0.95 |
| darkroom | Sr = 0 | 0.8 | 0.525 | 0.8 |

Table 2 shows the three surround conditions defined by CIECAM16, namely an average environment, a dim room environment and a darkroom environment. Each surround condition corresponds to a respective degree of adaptation factor F, impact of surrounding c and chromatic induction factor Nc. For example, when the absolute luminance Lsw on the projection surface in the surround field 36 is 10 nits and the absolute luminance Ldw of the color white in the display area is 50 nits, the surround ratio Sr is 0.2 (=10/50), and the set of surround parameters surround includes the degree of adaptation factor F of 0.9, the impact of surrounding c of 0.59 and the chromatic induction factor of 0.95. The set of ambient light measurements XYZ of a given color, the set of ambient light measurements XYZw of the color white, and the background luminance Yb in the ambient light have been acquired in Steps S202 and S206. The given color may be black, white, or any predetermined color. The processor 140 substitutes the set of ambient light measurements XYZ of the given color, the set of ambient light measurements XYZw of the color white, the luminance La of the adapting field, the background luminance Yb in the ambient light and surround parameters surround into Equation (1) to compute a set of appearance representatives Jab for the given color. For example, the background luminance Yb in the ambient light may be 5.63, the luminance La of the adapting field in the ambient light may be 13.41, and the Jab values of black, white, red, green, blue, cyan, magenta, and yellow may be shown in Table 3:

TABLE 3

| In the ambient light | J | a | b |
| --- | --- | --- | --- |
| black | 44.538 | 2.840 | 9.447 |
| white | 100.000 | −3.044 | −1.297 |
| red | 73.694 | 49.372 | 23.732 |
| green | 96.640 | −47.982 | 35.380 |
| blue | 55.183 | 24.248 | −46.669 |
| green | 95.713 | −37.358 | −10.450 |
| magenta | 79.744 | 49.264 | −20.650 |
| yellow | 96.887 | −16.320 | 41.581 |

In Steps S210 and S212, the ambient light source is turned off, and the imaging system 1 is in a darkroom, the projection device 10 projects the test image onto the projection surface 16, and the test image includes black and/or white. The color sensor 12 takes the set of darkroom measurements of the color white in the test image on the projection surface 16 to obtain the luminance La of the adapting field in the darkroom, and measures the set of darkroom measurements of the color black in the test image on the projection surface 16 to obtain the background luminance Yb in the darkroom. The set of darkroom measurements of the color white and the set of darkroom measurements of the color black may be expressed by CIE XYZ. The set of darkroom measurements of the color white may be regarded as the XYZ value of the reference white, and the Y value of the color white may be regarded as the absolute luminance Lw of the reference white in the darkroom.

In Step S214, the processor 140 determines whether the surround ratio Sr is less than a predetermined threshold Srth. The predetermined threshold Srth may be 0.2. If the surround ratio Sr is less than the predetermined threshold Srth, the surround condition may be a dim room environment or a darkroom environment. When the surround condition is changed to another dim room environment or darkroom environment, the gamut adjustment range of the projection device 10 may remain sufficient to maintain the color appearance consistency. The image calibration method 200 proceeds to Step S216. If the surround ratio Sr is larger than the predetermined threshold Srth, the surround condition is an average environment. When the surround condition changes to the darkroom environment or the dim room environment, the gamut adjustment range of the projection device 10 may be insufficient to maintain the color appearance consistency, and the image calibration method 200 terminates.

In Step S216, the processor 140 performs, according to the color appearance model, an inverse transform on each set of appearance representatives generated in Step S210, to generate a set of target values in the darkroom, and each set of target values may be represented by CIE XYZ. The inverse transform model of CIECAM16 may be expressed by Equation (4):

$$XYZ = CAM16UCSXYZ(Jab, XYZw, La, Yb, \text{surround}) \quad \text{Equation (4)}$$

where XYZ is the set of target values in the darkroom,
Jab is the set of color appearance representatives;
XYZw is a darkroom measurement of the color white;
La is a luminance of the adapting field in the darkroom;
Yb is the background luminance in the darkroom, and
Surround includes darkroom surround parameters including a factor determining an adaptation degree F., an impact of surrounding c, and a chromatic induction factor Nc.

The absolute luminance Lsw on the projection surface in the surround field may be the luminance measured by the color sensor 12 from the background area 34, and is substantially equal to zero. The darkroom measurement value Y of the color white may be regarded as the absolute luminance Lw of the reference white in the darkroom and the absolute luminance Ldw of the color white in the display area. The processor 140 may substitute the absolute luminance Lsw (≈0) on the projection surface in the surround field and the absolute white luminance Ldw in the display area into Equation (3) to compute the darkroom surround ratio Sr(≈0), thereby acquiring the darkroom surround parameters surround from Table 2. The luminance La of the adapting field in the darkroom may be obtained by the color sensor 12 directly measuring an absolute luminance of the color white at the central region of the projection surface 16. The set of color appearance representatives Jab is obtained from Step S208, and may be a set of color appearance representatives Jab for the color black, the color white, or the at least one predetermined color. The processor 140 substitutes the set of color appearance representatives Jab, the darkroom measurement value XYZw of the color white, the luminance La of the adapting field in the darkroom, the darkroom background luminance Yb, and the darkroom surround parameter surround into Equation (4) to compute the set of target values XYZ. For example, the darkroom background luminance Yb may be 0.13, the luminance La of the adapting field in the darkroom may be 0.03, and the target values XYZ of the colors black, white, red, green, blue, cyan, magenta, and yellow may be shown in Table 4:

TABLE 4

| In the ambient light | X | Y | Z |
|---|---|---|---|
| black | 7.610 | 7.478 | 4.105 |
| white | 226.315 | 238.090 | 253.599 |
| red | 99.847 | 48.509 | 3.562 |
| green | 83.804 | 226.716 | 9.053 |
| blue | 52.249 | 13.081 | 260.413 |
| green | 121.570 | 205.670 | 288.100 |
| magenta | 151.329 | 66.202 | 229.387 |
| yellow | 172.088 | 208.610 | 6.370 |

Figure 4:
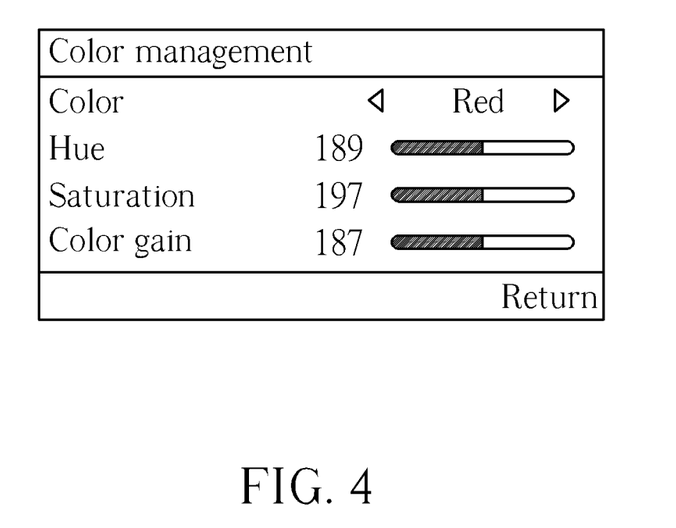
FIG. 4 shows a schematic diagram of an adjustment interface of the projection device in FIG. 1.

In Step S218, the processor 140 adjusts at least one color gain, at least one hue and at least one saturation of the at least one predetermined color according to the at least one set of target values of the at least one predetermined color, so as to configure the projection device 10 to the second gamut. In some embodiments, the range of the second gamut is less than the first gamut. In some embodiments, the user may enter a set of adjustment values according to at least one set of target values of at least one predetermined color, and the processor 140 may receive the set of adjustment values to adjust the at least one color gain, the at least one hue and the at least one saturation of the at least one predetermined color according to the set of adjustment values. The color sensor 12 may measure at least one set of updated measurements of the at least one predetermined color in real time, and in turn, the user may enter another set of adjustment values according to the at least one set of target values of the at least one predetermined color and at least one set of updated measurements. The process goes on until the at least one set of target values of the predetermined color matches the at least one set of updated measurements. FIG. 4 shows an adjustment interface of the projection device 10 for inputting the set of adjustment values for the at least one predetermined color. In other embodiments, the color sensor 12 may take at least one set of updated measurements of the at least one predetermined color in real time, and the processor 140 may automatically adjust the at least one color gain, the at least one hue and the at least one saturation of the at least one predetermined color according to the at least one set of target values of the at least one predetermined color and the at least one set of updated measurements until the at least one set of target values of the predetermined color matches the at least one set of updated measurements. In some embodiments, the at least one predetermined color may include six-axis colors, and the processor 140 adjusts six sets of color gains, hues, and saturations of the six-axis colors according to the six sets of target values of the six-axis colors, so as to configure the projection device 10 to the second gamut. In some embodiments, the processor 140 may further adjust at least one brightness of the at least one predetermined color to configure the projection device 10 to the second gamut.

In Step S220, the set of transformed color values may be a set of transformed RGB colors, the first color component may be a red component, the second color component may be a green component, and the third color component may be a blue component.

Figure 5:
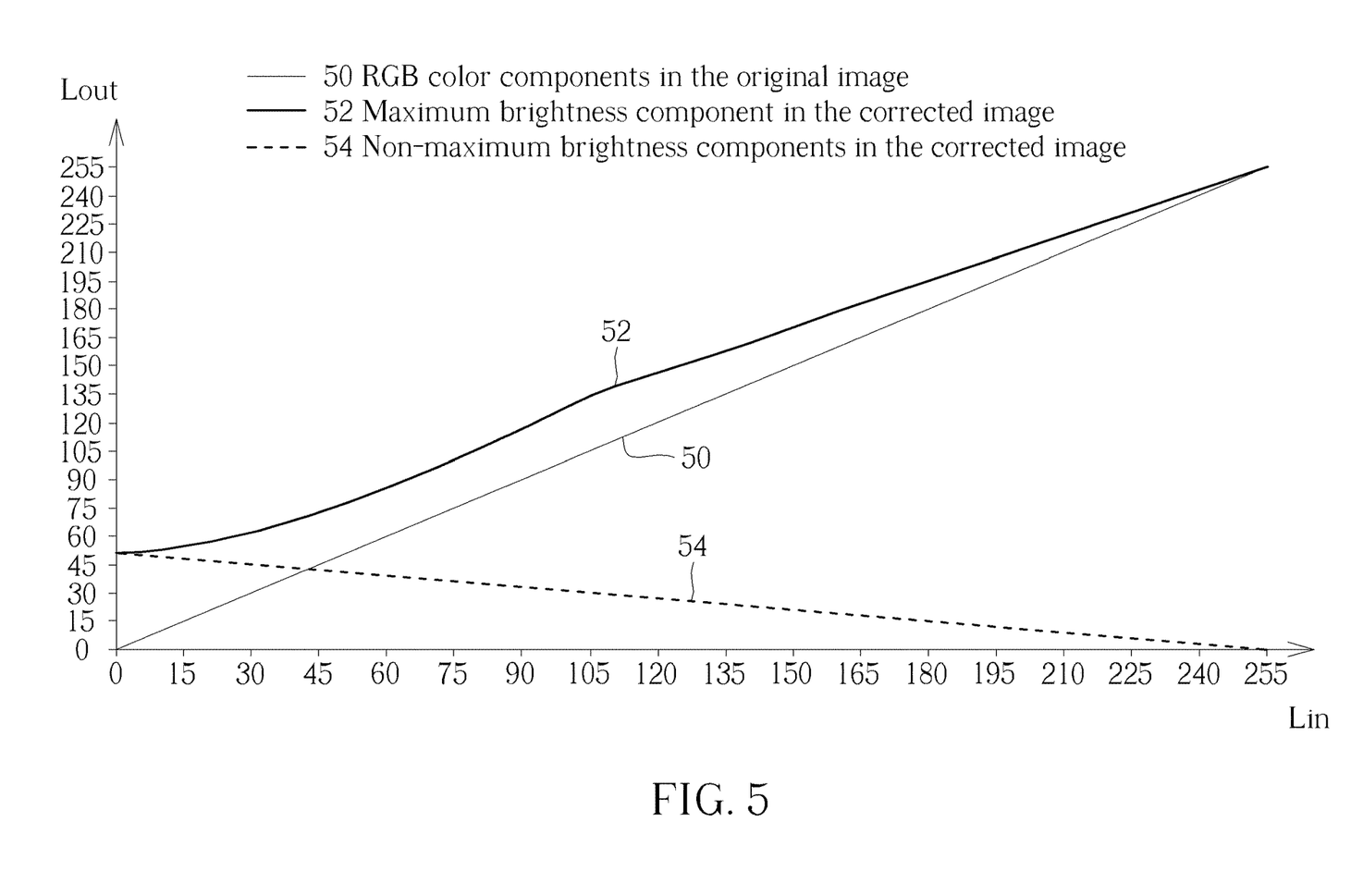
FIG. 5 is a schematic diagram of a base brightness and gamma correction according to an embodiment of the invention.

In Step S222, the processor 140 performs a base brightness (minimum brightness) calibration and gamma correction on the set of transformed RGB colors to calibrate the contrast and saturation. In the ambient light, the brightness of the image will be increased and the contrast will be decreased. Therefore, the processor 140 may further perform a base brightness and gamma correction on the set of transformed RGB colors to simulate the brightness and contrast of the image under the ambient light in a darkroom, while enhancing the saturation. FIG. 5 is a schematic diagram of the processor 140 performing the base brightness and gamma correction. The horizontal axis represents an input brightness Lin in 256 levels, and the vertical axis represents an adjusted brightness Lout in 256 levels. A curve 50 shows the brightness distribution of the RGB color components in the original image, a curve 52 shows the brightness distribution of a maximum brightness component in the corrected image, and a curve 54 shows the brightness distribution of non-maximum brightness components in the corrected image. The maximum brightness component may be a color component having the maximum brightness in the RGB color components, and the non-maximum brightness components may be a color component not having the maximum brightness in the RGB color components. The maximum brightness component may be obtained by Equation (5):

$$Cmax = Max(Rin, Gin, Bin) \qquad \text{Equation (5)}$$

Where Cmax is the maximum brightness component, and Rin, Gin, Bin are the red, green, and blue color components of an unadjusted image pixel.

If the first color component is larger than the second color component and the third color component, then the first color component corresponds to the color component having the maximum brightness, and the second color component and the third color component correspond to the color component having the non-maximum brightness. The brightness distribution 50 of the RGB color components of the original image is linear, and the minimum output brightness is a level 0. When performing a base brightness calibration, the processor 140 adds the black brightness component Jb in the set of color appearance representatives of black to the RGB color component to raise the brightness of the image. When performing a gamma correction, if the maximum brightness component Cmax is less than a correction threshold Iref, the first adjusted color component is positively correlated to a gamma value of the unadjusted first color component, the second adjusted color component is negatively correlated to a gamma value of the unadjusted second color component, and the third adjusted color component is negatively correlated to a gamma value of the unadjusted third color component, expressed by Equations (6), (7), (8).

$$Rout = ((255-Cmax)/255*Jb) + (Rin/255)^\gamma * (255-(255-Cmax)/255*Jb) \qquad \text{Equation (6)}$$

$$Gout = ((255-Cmax)/255*Jb) + (Gin/255)^\gamma * (255-(255-Cmax)/255*Jb) \qquad \text{Equation (7)}$$

$$Bout = ((255-Cmax)/255*Jb) + (Bin/255)^\gamma * (255-(255-Cmax)/255*Jb) \qquad \text{Equation (8)}$$

where Rout, Gout, Bout are the red, green, and blue color components after adjusting an image pixel,
Rin, Gin, Bin are the red, green, and blue color components of an unadjusted image pixel;
Jb is the brightness component of the color black;
Cmax is the maximum brightness component, and
  γ is the gamma value.

In FIG. 5, the calibration threshold Iref is set approximately at 105. When an RGB color component is less than the calibration threshold Iref, the curve 52 shows that the adjusted brightness and the gamma correction value of the unadjusted brightness of the maximum brightness component are positively correlated, and minimum brightness of the adjusted maximum brightness component is approximately at a level 50, the curve 54 shows that the adjusted brightness and the gamma correction value of the unadjusted brightness of the non-maximum brightness components are negatively correlated, and the maximum brightness of the adjusted non-maximum brightness components is set approximately at the level 50.

If the RGB color component is larger than the calibration threshold Iref, the first adjusted color component is positively correlated to the unadjusted first color component, the second adjusted color component is negatively correlated to the unadjusted second color component, and the third adjusted color component is negatively correlated to the unadjusted third color component, expressed by Equations (9), (10), (11).

$$Rout=((255-Cmax)/255*Jb)+(Rin/255)^{1.0}*(255-(255-Cmax)/255*Jb) \quad \text{Equation (9)}$$

$$Gout=((255-Cmax)/255*Jb)+(Gin/255)^{1.0}*(255-(255-Cmax)/255*Jb) \quad \text{Equation (10)}$$

$$Bout=((255-Cmax)/255*Jb)+(Bin/255)^{1.0}*(255-(255-Cmax)/255*Jb) \quad \text{Equation (11)}$$

where Rout, Gout, Bout are the red, green, and blue color components after adjusting an image pixel,
Rin, Gin, Bin are the red, green, and blue color components of an unadjusted image pixel;
Jb is the brightness component of black, and
Cmax is the maximum brightness component.

In FIG. 5, when the RGB color component is larger than the calibration threshold Iref, the curve 52 shows that the adjusted brightness and the unadjusted brightness of the maximum brightness component are positively correlated, and the curve 54 shows that the adjusted brightness and the unadjusted brightness of the non-maximum brightness components are negatively correlated.

In Step S224, the projection device 10 projects the adjusted red, green, and blue color components of each pixel, thereby maintaining the color appearance consistency in the ambient light and in the darkroom.

While the embodiment provides a method for maintaining the color appearance consistency of the darkroom and the ambient light, those skilled in the art may maintain the color appearance consistency of different ambient lights according to the same principle outlined in the image calibration method 200.

The imaging system 1 and the image calibration method 200 adjust the gamut of the projection device 10 using the color appearance model, while adjusting the contrast and saturation of the image via image processing, achieving the color appearance consistency in the darkroom and the ambient light.

Figure 6:
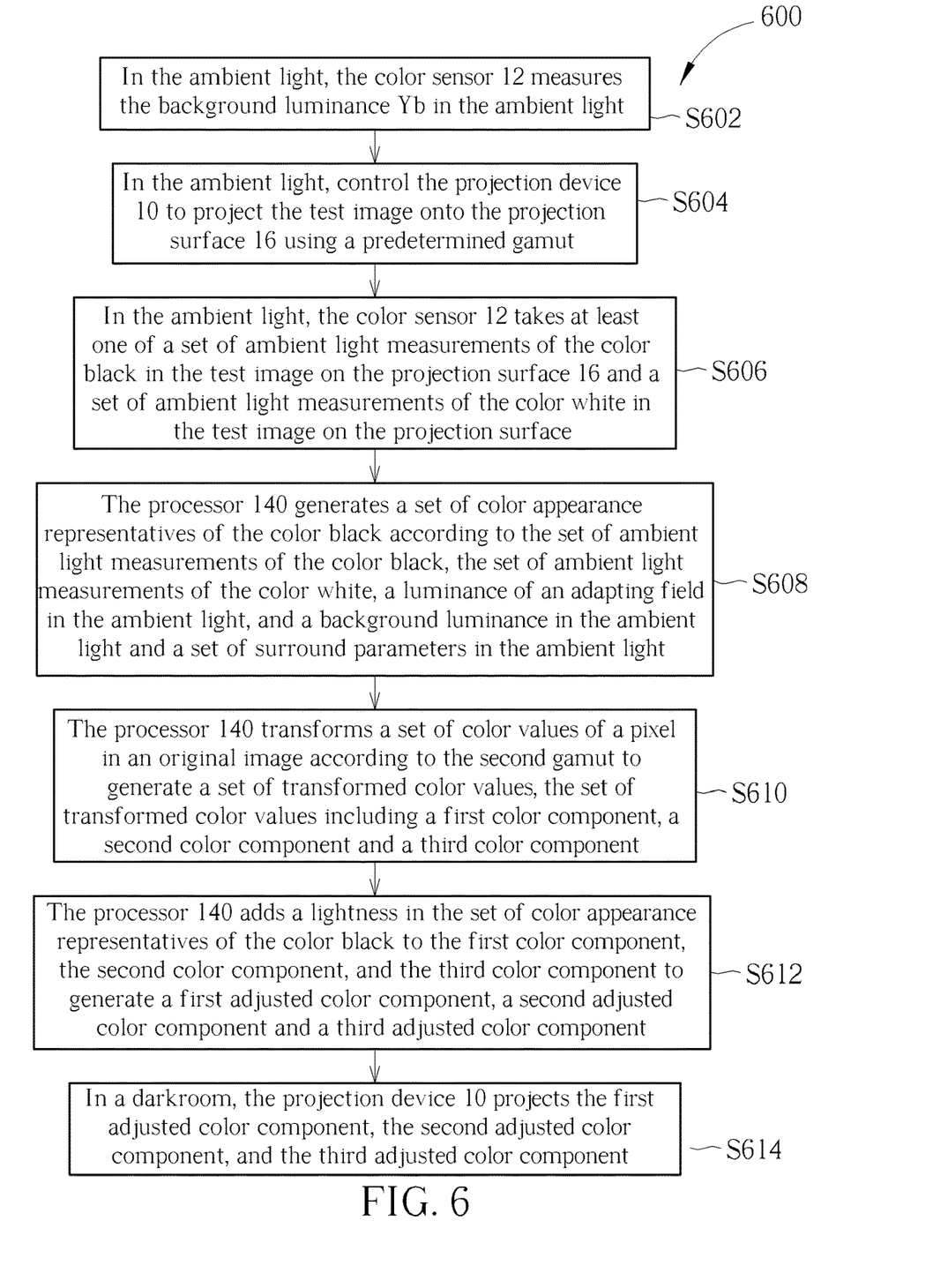
FIG. 6 is a flowchart of another image calibration method of the imaging system in FIG. 1.

FIG. 6 is a flowchart of another image correction method 600 of the imaging system 1, including Steps S602 to S614 for maintaining the color appearance consistency of the image. Steps S602 to S608 are used to generate color appearance representatives in the ambient light. Steps S610 to S614 are used to perform contrast and saturation calibration for the image. Any reasonable step change or adjustment is within the scope of the disclosure. Steps S602 to S614 are detailed as follows:

Step S602: In the ambient light, the color sensor 12 measures the background luminance Yb in the ambient light;

Step S604: In the ambient light, control the projection device 10 to project the test image onto the projection surface 16 using a predetermined gamut;

Step S606: In the ambient light, the color sensor 12 takes at least one of a set of ambient light measurements of the color black in the test image on the projection surface 16 and a set of ambient light measurements of the color white in the test image on the projection surface;

Step S608: The processor 140 generates a set of color appearance representatives of the color black according to the set of ambient light measurements of the color black, the set of ambient light measurements of the color white, a luminance of an adapting field in the ambient light, and a background luminance in the ambient light and a set of surround parameters in the ambient light;

Step S610: The processor 140 transforms a set of color values of a pixel in an original image according to the second gamut to generate a set of transformed color values, the set of transformed color values including a first color component, a second color component and a third color component;

Step S612: The processor 140 adds a lightness in the set of color appearance representatives of the color black to the first color component, the second color component, and the third color component to generate a first adjusted color component, a second adjusted color component and a third adjusted color component;

Step S614: In a darkroom, the projection device 10 projects the first adjusted color component, the second adjusted color component, and the third adjusted color component.

The Steps S602 to S608 are similar to the Steps S202 to S208 except that the test image may include black and/or white, and only one set of color appearance representatives of black is generated. Steps S610 to S614 are similar to Steps S220 to S224, the details therefor may be found in the preceding paragraphs, and will not be repeated here.

The imaging system 1 and the image calibration method 600 adjust the contrast and saturation of the image via image processing, achieving the color appearance consistency in the darkroom and the ambient light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image calibration method of an imaging system, the imaging system comprising a projection device, a color sensor and a processor, the image calibration method comprising:

in an ambient light, configuring the projection device to utilize a first gamut to project a test image onto a projection surface, the test image including a color black, a color white and at least one predetermined color;

in the ambient light, the color sensor taking at least one of a set of ambient light measurements of the color black, a set of ambient light measurements of the color white, and a set of ambient light measurements of the at least one predetermined color;

the processor generating a set of color appearance representatives of the color black, a set of color appearance representatives of the color white, and a set of color appearance representatives of the at least one predetermined color according to the set of ambient light measurements of the color black, the set of ambient light measurements of the color white, the set of ambient light measurements of the at least one predetermined color, a luminance of an adapting field in the ambient light, and a background luminance in the ambient light and a set of surround parameters in the ambient light;

in a darkroom, the projection device projecting the test image onto the projection surface;

in the darkroom, the color sensor taking at least one of a set of darkroom measurements of the color black, a set of darkroom measurements of the color white, and a set of darkroom measurements of the at least one predetermined color;

if a surround ratio is less than a predetermined threshold, the processor generating at least one set of target values of the at least one predetermined color according to the set of color appearance representatives of the at least one predetermined color, the set of darkroom measurements of the color white, a luminance of the adapting field in the darkroom, and a background luminance in the darkroom and a set of surround parameters in the darkroom;

the processor configuring the projection device to a second gamut according to the at least one set of target values of the at least one predetermined color, the second gamut being different from and the first gamut;

the processor transforming a set of color values of a pixel in an original image according to the second gamut to generate a set of transformed color values, the set of transformed color values including a first color component, a second color component and a third color component, the processor adding a lightness in the set of color appearance representatives of the color black to the first color component, the second color component, and the third color component to generate a first adjusted color component, a second adjusted color component and a third adjusted color component; and in the darkroom, the projection device projecting the first adjusted color component, the second adjusted color component, and the third adjusted color component.

2. The image calibration method of claim 1, wherein the processor configuring the projection device to the second gamut according to the at least one set of target values of the at least one predetermined color comprises: the processor adjusting at least one color gain, at least one hue and at least one saturation of the at least one predetermined color according to the at least one set of target values of the at least one predetermined color, so as to configure the projection device to the second gamut.

3. The image calibration method of claim 1, wherein the at least one predetermined color includes six-axis colors.

4. The image calibration method of claim 1, wherein each one of the set of color appearance representatives of the color black, the set of color appearance representatives of the color white, and the set of color appearance representatives of the at least one predetermined color comprises a lightness, a red-green correlate, and a yellow-blue correlate.

5. The image calibration method of claim 1, wherein if the first color component is larger than the second color component, the third color component and a calibration threshold, the first adjusted color component is positively correlated to the first color component, the second adjusted color component is negatively correlated to the second color component, and the third adjusted color component is negatively correlated to the third color component.

6. The image calibration method of claim 1, wherein if the first color component is larger than the second color component and the third color component, and the first color component is less than a calibration threshold, the first adjusted color component is positively correlated to a gamma value of the first color component, the second adjusted color component is negatively correlated to a gamma value of the second color component, and the third adjusted color component is negatively correlated to a gamma value of the third color component.

7. The image calibration method of claim 1, wherein the background luminance in the ambient light is a luminance of the set of ambient light measurements of the color black.

8. The image calibration method of claim 1, further comprising in the ambient light, the projection device stopping projecting onto the projection surface, and the color sensor measuring a luminance on the projection surface to generate the background luminance in the ambient light.

9. The image calibration method of claim 1, further comprising in the ambient light, the color sensor measuring a luminance of a background area to generate the background luminance in the ambient light.

10. The image calibration method of claim 1, further comprising in the ambient light, the color sensor measuring a luminance of the color white at a stimulus point on the projection surface to generate the luminance of the adapting field in the ambient light.

11. The image calibration method of claim 1, wherein a luminance of the set of ambient light measurements of the color white is an absolute luminance of a color white, and the method further comprises:

in the ambient light, turning off the projection device, and the color sensor measuring a luminance of the projection surface to generate the relative luminance of the color white; and the processor generating the luminance of the adapting field in the ambient light according to the absolute luminance of the color white, the background luminance in the ambient light, and the relative luminance of the color white.

12. The image calibration method of claim 11, further comprising:

the processor computing a surround ratio of the background luminance in the ambient light and the relative luminance of the color white; and the processor acquiring the set of surround parameters in the ambient light according to the surround ratio.

13. The image calibration method of claim 1, further comprising:

in the ambient light, the color sensor measuring a luminance of the color white on the projection surface and a luminance in a surround field;

the processor computing a surround ratio of the luminance of the color white on the projection surface and the luminance in the surround field; and the processor acquiring the set of surround parameters in the ambient light according to the surround ratio.

14. An image calibration method of an imaging system, the imaging system comprising a projection device, a color sensor and a processor, the image calibration method comprising:

in an ambient light, configuring the projection device to utilize a first gamut to project a test image onto a projection surface, the test image including black and white;

in the ambient light, the color sensor taking at least one of a set of ambient light measurements of the color black and a set of ambient light measurements of the color white;

the processor generating a set of color appearance representatives of the color black according to the set of ambient light measurements of the color black, the set of ambient light measurements of the color white, a luminance of an adapting field in the ambient light, and a background luminance in the ambient light and a set of surround parameters in the ambient light;

the processor transforming a set of color values of a pixel in an original image according to a second gamut to generate a set of transformed color values, the set of transformed color values including a first color component, a second color component and a third color component;

the processor adding a lightness in the set of color appearance representatives of the color black to the first color component, the second color component, and the third color component to generate a first adjusted color component, a second adjusted color component and a third adjusted color component; and in a darkroom, the projection device projecting the first adjusted color component, the second adjusted color component, and the third adjusted color component.

15. The image calibration method of claim 14, wherein if the first color component is larger than the second color component, the third color component and a calibration threshold, the first adjusted color component is positively correlated to the first color component, the second adjusted color component is negatively correlated to the second color component, and the third adjusted color component is negatively correlated to the third color component.

16. The image calibration method of claim 14, wherein if the first color component is larger than the second color component and the third color component, and the first color component is less than a calibration threshold, the first adjusted color component is positively correlated to a gamma value of the first color component, the second adjusted color component is negatively correlated to a gamma value of the second color component, and the third adjusted color component is negatively correlated to a gamma value of the third color component.

17. The image calibration method of claim 14, wherein the first gamut is larger than or equal to a DCI-P3 gamut.

18. The image calibration method of claim 14, wherein the range of the second gamut is less than the first gamut.

19. The image calibration method of claim 14, wherein the background luminance in the ambient light is a luminance of the set of ambient light measurements of the color black.

20. The image calibration method of claim 14, further comprising in the ambient light, the projection device stopping projecting onto the projection surface, and the color sensor measuring a luminance on the projection surface to generate the background luminance in the ambient light.

21. The image calibration method of claim 14, further comprising in the ambient light, the color sensor measuring a luminance of a background area to generate the background luminance in the ambient light.

22. The image calibration method of claim 14, further comprising, in the ambient light, the color sensor measuring a luminance of the color white at a stimulus point on the projection surface to generate the luminance of the adapting field in the ambient light.

23. The image calibration method of claim 14, wherein a luminance of the set of ambient light measurements of the color white is an absolute luminance of a color white, and the method further comprises:

in the ambient light, turning off the projection device, and the color sensor measuring a luminance of the projection surface to generate the relative luminance of the color white; and the processor generating the luminance of the adapting field in the ambient light according to the absolute luminance of the color white, the background luminance in the ambient light, and the relative luminance of the color white.

24. The image calibration method of claim 23, further comprising:

the processor computing a surround ratio of the background luminance in the ambient light and the relative luminance of the color white; and the processor acquiring the set of surround parameters in the ambient light according to the surround ratio.

25. The image calibration method of claim 14, further comprising:

in the ambient light, the color sensor measuring a luminance of the color white on the projection surface and a luminance in a surround field;

the processor computing a surround ratio of the luminance of the color white on the projection surface and the luminance in the surround field; and the processor acquiring the set of surround parameters in the ambient light according to the surround ratio.

* * * * *